(12) United States Patent
Mehrer et al.

(10) Patent No.: US 7,509,812 B2
(45) Date of Patent: Mar. 31, 2009

(54) DUAL IGNITION SYSTEM FOR A GAS TURBINE ENGINE

(75) Inventors: Michael E. Mehrer, San Diego, CA (US); Daih-Yeou Chen, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 907 days.

(21) Appl. No.: 10/922,471

(22) Filed: Aug. 20, 2004

(65) Prior Publication Data
US 2006/0037326 A1  Feb. 23, 2006

(51) Int. Cl.
*F02C 7/22* (2006.01)
(52) U.S. Cl. .............................. 60/778; 60/776; 60/786; 60/39.821; 60/39.827
(58) Field of Classification Search .................. 60/776, 60/778, 786, 39.821, 39.827, 39.828
See application file for complete search history.

(56) References Cited

U.S. PATENT DOCUMENTS

| | | | |
|---|---|---|---|
| 4,899,579 A * | 2/1990 | Sweppy et al. ............. 73/118.1 |
| 5,399,942 A | 3/1995 | Frus | |
| 5,852,381 A | 12/1998 | Wilmot et al. | |
| 6,104,143 A | 8/2000 | Bonavia | |
| 6,195,247 B1 * | 2/2001 | Cote et al. .................. 361/253 |
| 6,232,703 B1 | 5/2001 | Huffman | |
| 6,559,647 B1 * | 5/2003 | Bidner et al. ............... 324/393 |
| 6,603,216 B2 | 8/2003 | Costello | |

* cited by examiner

*Primary Examiner*—Devon Kramer
*Assistant Examiner*—Andrew Nguyen
(74) *Attorney, Agent, or Firm*—Carlson, Gaskey & Olds PC

(57) ABSTRACT

A dual channel ignition circuit (Channel A and a Channel B). In a start sequence in which a successful ignition event occurs, an exciter controller first energizes only a primary ignition channel (Channel A). Once the exciter controller recognizes a success light-off, the alternate channel (Channel B) will also then be excited as the gas turbine engine is accelerated to a self-sustaining speed. The exciter controller will then switch the primary alternative designation of the channels for the next start attempt. In a start sequence in which an unsuccessful ignition event occurs, the exciter controller sets a fail-to-start on the primary ignition channel on a failure to start A/B counter such that a failed ignition channel is diagnosed without dedicated electronic diagnostic circuits while still attempting to excite both circuits to enhance the dependability of a successful engine light-off.

10 Claims, 4 Drawing Sheets

DUAL IGNITION SYSTEM FOR A GAS TURBINE ENGINE

BACKGROUND OF THE INVENTION

The present invention relates to a start system for a gas turbine engine, and more particularly to a dual ignition system that provides an environment conducive to igniting a gas turbine engine while providing diagnostic information.

Gas turbine engine ignition systems typically include an ignition exciter that generates the discharge energy used to fire the ignition plugs or igniters. These circuits are commonly used within the aviation industry, but are not limited to aircraft turbine engines. For example, gas turbine generators and other small turbine engines will typically utilize exciter circuits to provide spark energy to one or more igniter plugs.

A start sequence for a gas turbine engine coordinates engine speed, ignition and fuel delivery to achieve a reliable start. Conventionally, a dedicated starter motor or a starter-generator, is drivably coupled to the gas turbine engine and is operated to produce rotation thereof. As the starter accelerates the engine, a fuel delivery pump driven by a gearbox attached to a rotor of the gas turbine engine provides fuel flow thereto. The igniters are then fired to effect ignition in a combustor of the engine. Upon successful ignition, and once the engine has reached a self-sustaining speed, the starter is disengaged.

Gas turbine engines, specifically Auxiliary Power Units (APUs), often employ an ignition exciter box to drive two ignition plugs. The ignition plugs are positioned around the combustor, separated in position for optimal ignition of the air/fuel mixture. Each of the two ignition plugs may be driven independently. For optimum ignition, it is common to fire both ignition plugs together such that the fuel-air mixture is ignited at two locations to foster quick propagation of the flame.

Conventionally, exciter diagnostic circuits are designed for an ignition exciter to provide fault diagnostic data for each of the two ignition plugs and driver circuits. Another approach is to drive only one ignition circuit during a start sequence at a time, and use a failure to start as a diagnostic indication that an ignition circuit has failed. The problem with driving a single ignition circuit at a time is that lighting of the combustor in a single area by one ignition plug may not provide as reliable a chance of a successful engine light.

Accordingly, it is desirable to provide an ignition system for a gas turbine engine that ensures start reliability without dedicated electronic diagnostic circuits in an inexpensive, uncomplicated and lightweight arrangement.

SUMMARY OF THE INVENTION

The ignition system according to the present invention provides a dual channel ignition circuit. In a start sequence in which a successful ignition event occurs, an exciter controller first energizes only a primary ignition channel. Once the exciter controller recognizes a success light-off, the alternate channel will also then be excited as the gas turbine engine is accelerated to a self-sustaining speed. After the gas turbine engine has accelerated to the self-sustained speed and a sustained light is declared, the ignition channels are both de-energized. The exciter controller then switches the primary/alternative designation of the channels for the next start attempt.

In a start sequence in which an unsuccessful ignition event occurs, the exciter controller fails to recognize a light-off of the gas turbine engine within a predetermined time interval. After the predetermined time interval, the exciter controller sets a fail-to-start on the primary ignition channel on a failure to start A/B counter. After setting the fail-to-start for the designated channel, the exciter controller energizes the alternate channel. If the exciter controller then recognizes a successful light-off, the gas turbine engine is accelerated to a self-sustaining speed, a sustained light is declared, and the ignition Channels are both de-energized. The exciter controller will then switch the primary/alternative designation of the channels for the next start attempt.

For the next start attempt, should a successful light-off be identified, the failure to start A/B counter remains at the incremented level. Should, however, a light-off failure be identified, the failure to start A/B counter is decremented to account for a failed light-off which may not have been due to a failed ignition channel. The failed channel indication identifies that an ignition channel requires maintenance. Using this logic, a failed ignition channel is diagnosed without dedicated electronic diagnostic circuits while at the same time simultaneously exciting both circuits to enhance the ability to achieve a successful engine light-off.

The present invention therefore provides an ignition system for a gas turbine engine that ensures start reliability without dedicated electronic diagnostic circuits in an inexpensive, uncomplicated and lightweight arrangement.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
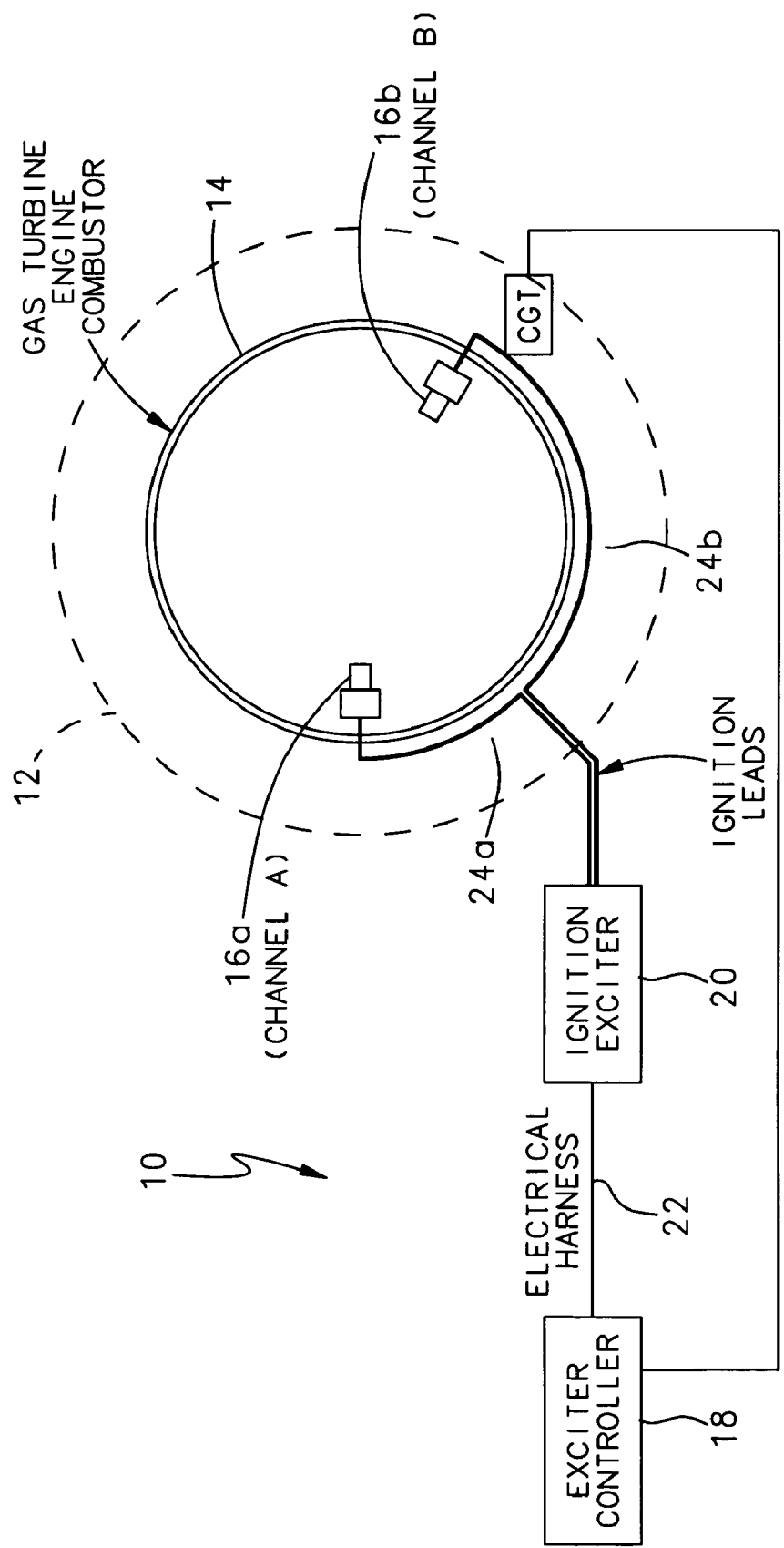
FIG. 1 is a general perspective view an exemplary gas turbine engine stat system for use with the present invention.

FIG. 1 illustrates a general schematic view of an ignition system 10 for a gas turbine engine 12 (illustrated schematically) such as an auxiliary power unit (APU). It should be understood that the ignition system may be used in other applications, such as in a stationary generating station or ground based unit for a vehicle or the like.

The ignition system 10 operates to ignite a fuel-air mixture in an engine combustor 14 through a first ignition plug 16a and a second ignition plug 16b. An exciter controller 18 communicates with an ignition exciter 20 through a wiring harness 22 or the like. The ignition exciter 20 drives the ignition plug 16a and the second ignition plug 16b through a first ignition lead 24a and a second ignition lead 24b, respectively.

The first ignition lead 24a and the first ignition plug 16a is herein referred to as Channel A while the second ignition lead 24b and the second ignition plug 16b is herein referred to as Channel B. It should be understood that any number of channels will benefit from the present invention.

Figure 2:
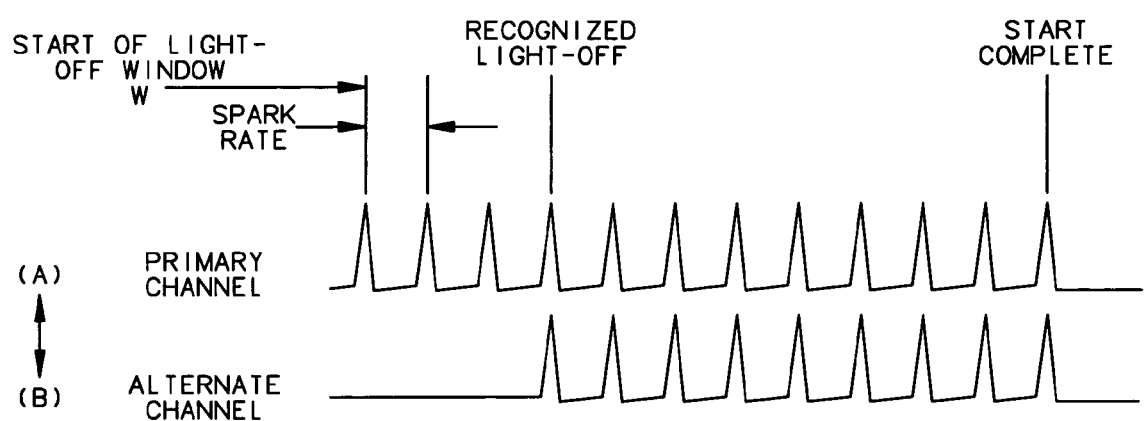
FIG. 2 is a spark phasing diagram of a successful start.

Referring to FIG. 2, a successful ignition event is illustrated in a spark phasing diagram. The exciter controller 18 tracks the last ignition channel which is designated as the primary channel. The designation of the primary ignition channel alternates between Channel A and Channel B for each start attempt. That is, the exciter controller 18 alternates the primary channel. Here, Channel A will be first designated primary.

In a start sequence in which a successful ignition event occurs, ignition is initiated by a start command which accelerates the gas turbine engine 12 to a light off window to await ignition. Once the exciter controller 18 recognizes that the gas turbine engine 12 (FIG. 1) has reached the gas turbine engine light-off window W, the exciter controller 18 first energizes only the primary ignition channel (Channel A). That is, the exciter controller 18 communicates with the ignition exciter 20 to drive the ignition plug 16*a* at a predetermined spark rate.

With only the primary ignition channel sparking, the exciter controller 18 monitors the gas turbine engine for an increase in temperature such as through an Exhaust Gas Temperature (EGT) sensor 26 (FIG. 1) that indicates that the fuel/air mixture has successfully lighted. It should be understood that other sensors and identification systems may be utilized to identify successful light-off.

Once the exciter controller 18 recognizes a success light-off, the alternate channel (Channel B) will also then be excited as the gas turbine engine 12 is accelerated to a self-sustaining speed. During the time that the primary and alternate channels are both energized, the spark from the first ignition plug 16*a* and the second ignition plug 16*b* will be phased for optimal spark propagation. Preferably, the sparks are timed to coincide or offset with a slight time delay as understood by one of ordinary skill having the benefit of the present invention to obtain the spark propagation.

After the gas turbine engine 12 has accelerated to the self-sustained speed and a sustained light is declared, the ignition plugs 16*a*, 16*b* are both de-energized. The exciter controller 18 will then switch the primary alternative designation of the channels for the next start attempt. That is, Channel B will become the Primary Channel and Channel A will become the alternate channel. Switching between channel A and Channel B will preferably occur for each start attempt.

Diagnosis of an Unsuccessful Ignition Event

Figure 3:
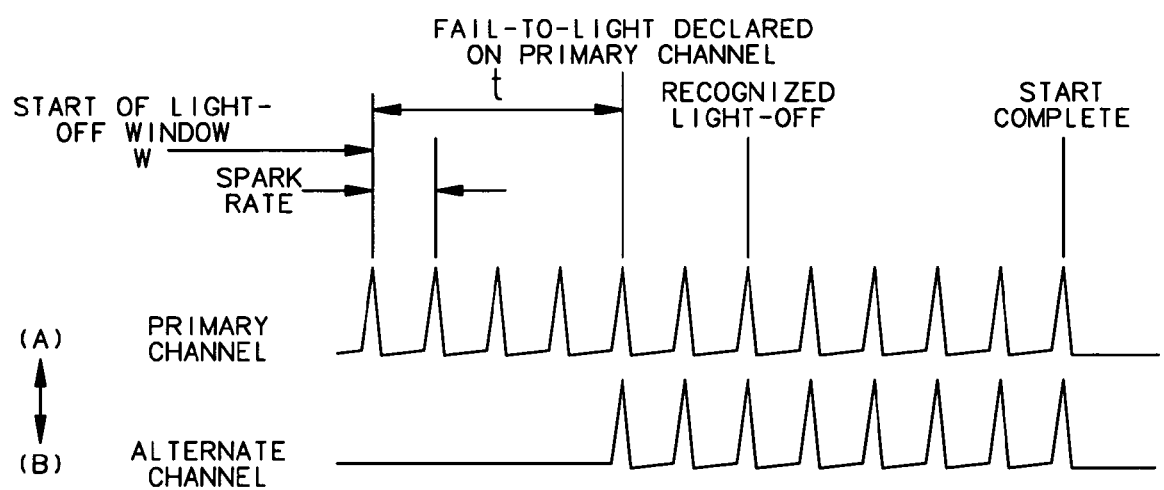
FIG. 3 is a spark phasing diagram of an unsuccessful start.
Figure 4:
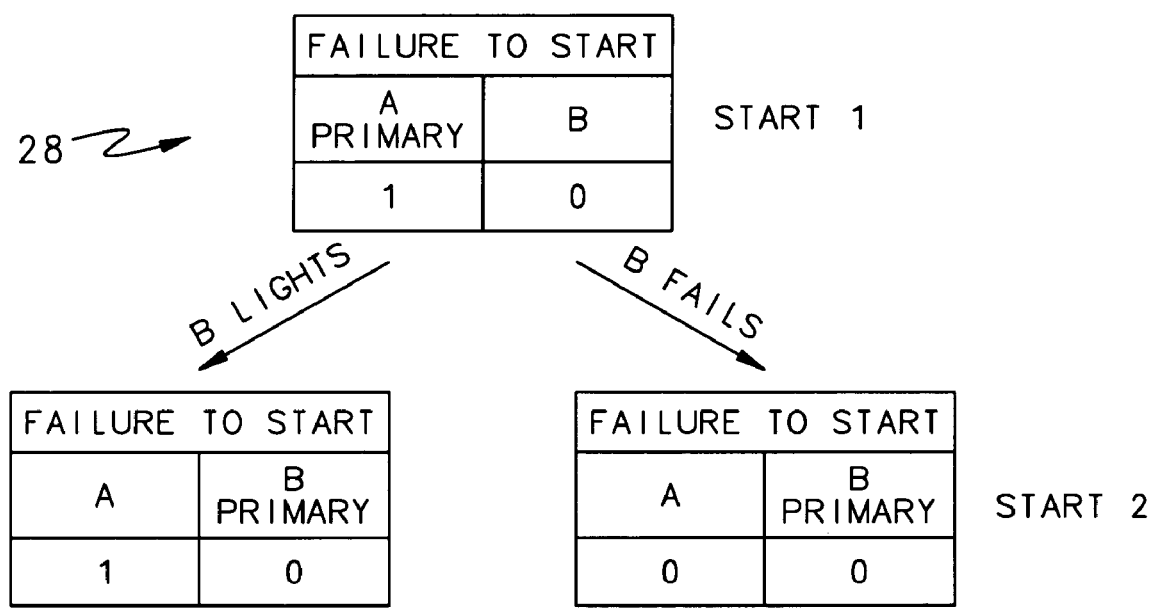
FIG. 4 is a graphical representation of a failure to start A/B counter after a start event.

Referring to FIG. 3, the exciter controller 18 first energizes only the primary ignition channel (Channel A) as described above. Here, however, the exciter controller fails to recognize a light-off of the gas turbine engine 12 within a within a predetermined time interval t (fail-to-light on primary timer). After the predetermined time interval, the exciter controller sets a fail-to-start on ignition channel A on a failure to start A/B counter 28 (illustrated schematically at FIG. 4).

After setting the fail-to-start on channel A on the failure to start A/B counter 28, the exciter controller 18 energizes the alternate channel (Channel B). If the exciter controller then recognizes a successful light-off, the gas turbine engine 12 is accelerated to a self-sustaining speed, a sustained light is declared, and the ignition plugs 16*a*, 16*b* are both de-energized.

The exciter controller 18 will then switch the primary/alternative designation of the channels for the next start attempt. That is, Channel B will become the Primary Channel and Channel A will become the alternate channel. Should a successful light-off on Channel B be identified, the fail-to-start on ignition channel A on the failure to start A/B counter 28 remains at the incremented level. The exciter controller 18 will then switch the primary/alternative designation of the channels for the next start attempt. That is, Channel A will again become the primary channel and Channel B will again become the alternate channel.

Should, however, the exciter controller 18 fail to recognize a light-off of the gas turbine engine 12 within a predetermined time interval t (fail-to-light on primary timer) during the start attempt when Channel B is designated the primary channel, the exciter controller 18 decrements the fail-to-start on ignition channel A on the failure to start A/B counter 28. The decrease in the fail-to-start on ignition channel A on the failure to start A/B counter 28 accounts for failed light-offs which may not have been due to a failed ignition channel. That is, if a failure occurs on both channels sequentially factors other than a failed ignition channel A/B may have caused the failure to start even when the ignition channel A/B is properly operational.

When the fail-to-start on ignition channel A counter or the fail-to-start on ignition channel B counter of the failure to start A/B counter 28 exceeds a pre-designated number and/or rate during valid start conditions, a failed channel is declared. The failed channel indication is used for maintenance purposes to identify that an ignition channel requires maintenance. Using this logic, a failed ignition channel is diagnosed without dedicated electronic diagnostic circuits while at the same time simultaneously exciting both circuits to enhance the ability to achieve a successful engine light-off.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of igniting a gas turbine engine comprising the steps of:
   (1) energizing a primary ignition channel;
   (2) recognizing a successful light-off;
   (3) energizing an alternate ignition channel after said step (2); and
   (4) alternating the primary ignition channel between an A Channel and a B Channel at each start attempt.

2. A method of igniting a gas turbine engine comprising the steps of:
   (1) energizing a primary ignition channel;
   (2) failing to recognize a successful light-off during a predetermined time interval; and
   (3) energizing an alternate ignition channel after said step (2); and
   (4) alternating the primary ignition channel between an A Channel and a B Channel at each start attempt.

3. A method as recited in claim 2, further comprising the steps of:
   (5) incrementing a fail-to-start on the primary ignition channel on a failure to start A/B counter in response to said step (2).

4. A method as recited in claim 3, further comprising the steps of:
   (6) alternating the primary ignition channel between an A Channel and a B Channel on the next staff attempt;
   (7) recognizing the successful light-off during said step (2);

(8) alternating the primary ignition channel between an A Channel and a B Channel on the next staff attempt;

(9) recognizing the successful light-off during said step (2) of the previously failure-to-start primary channel; and

(10) decrementing the fail-to-start on the primary ignition channel on the failure to staff A/B counter in response to said step (2).

5. A method of igniting a gas turbine engine comprising the steps of:

(1) designating an A channel as a primary ignition channel and a B Channel as an alternate ignition channel;

(2) energizing the A channel;

(3) recognizing a successful light-off of the A Channel;

(4) energizing the B Channel after said step (3);

(5) shutting down the A Channel and the B Channel after a sustained light of the gas turbine engine is confirmed; and (6) designating the B channel as the primary ignition channel and the A Channel as the alternate ignition channel for the next start attempt.

6. A method as recited in claim 5, further comprising the steps of:

(7) energizing the B channel;

(8) failing to recognize a successful light-off during a predetermined time interval; and (9) energizing the A Channel after the predetermined time interval.

(10) incrementing a fail-to-start on the B Channel on a failure to start A/B counter in response to said step (8).

7. A method as recited in claim 6, further comprising the steps of:

(11) designating the A channel as the primary ignition channel and the B Channel as the alternate ignition channel for the next start attempt;

(12) energizing the A channel;

(13) failing to recognize a successful light-off during a predetermined time interval;

(14) energizing the B Channel after the predetermined time interval; and

(15) decrementing the fail-to-start on the B Channel on the failure to staff A/B counter in response to said step (13).

8. A method as recited in claim 6, further comprising the steps of:

(11) designating the A channel as the primary ignition channel and the B Channel as the alternate ignition channel for the next start attempt;

(12) energizing the A channel;

(13) recognizing a successful light-off during the predetermined time interval;

(14) energizing the B Channel in response to said step (13);

(15) maintaining the fail-to-start on the B Channel on the failure to start A/B counter in response to said step (13).

9. A method as recited in claim 8, further comprising the steps of:

(16) shutting down the A Channel and the B Channel after a sustained light of the gas turbine engine is confirmed; and

(17) designating the B channel as the primary ignition channel and the A Channel as the alternate ignition channel for the next start attempt.

10. A method of igniting a gas turbine engine comprising the steps of:

(1) energizing a primary ignition channel;

(2) recognizing a successful light-off of the A channel;

(3) energizing an alternate ignition channel after said step (2); and (4) alternating the primary ignition channel between an A Channel and a B Channel.

* * * * *

UNITED STATES PATENT AND TRADEMARK OFFICE
CERTIFICATE OF CORRECTION

PATENT NO. : 7,509,812 B2  Page 1 of 1
APPLICATION NO. : 10/922471
DATED : March 31, 2009
INVENTOR(S) : Mehrer et al.

It is certified that error appears in the above-identified patent and that said Letters Patent is hereby corrected as shown below:

IN THE CLAIMS:

Claim 4, Column 4, Line 65: Change "staff" to "start"

Claim 4, Column 5, Line 2: Change "staff" to "start"

Claim 4, Column 5, Line 6: Change "staff" to "start"

Claim 7, Column 6, Line 6: Change "staff" to "start"

Claim 6, Column 5, Line 27: Change "." to ";"

Signed and Sealed this

Thirtieth Day of June, 2009

JOHN DOLL
*Acting Director of the United States Patent and Trademark Office*